United States Patent
Leitner et al.

(10) Patent No.: US 6,491,122 B2
(45) Date of Patent: Dec. 10, 2002

(54) VARIABLE-SPEED CONTROL FOR VEHICLE

(75) Inventors: George Leitner, Tresckow, PA (US); Scott Meuser, Dallas, PA (US)

(73) Assignee: Pride Mobility Products Corporation, West Pittston, PA (US)

(*) Notice: Subject to any disclaimer, the term of this patent is extended or adjusted under 35 U.S.C. 154(b) by 0 days.

(21) Appl. No.: 09/849,883

(22) Filed: May 1, 2001

(65) Prior Publication Data

US 2002/0003055 A1 Jan. 10, 2002

Related U.S. Application Data

(60) Provisional application No. 60/202,457, filed on May 8, 2000.

(51) Int. Cl.⁷ .................................................. B60K 1/00
(52) U.S. Cl. ..................... 180/65.8; 180/65.1; 180/216; 180/908
(58) Field of Search .......................... 180/65.1, 65.6, 180/65.8, 210, 211, 213, 214, 907, 908, 215, 216, 217; 280/250.1, 304.1; 318/770, 771, 772

(56) References Cited

U.S. PATENT DOCUMENTS

| | | | |
|---|---|---|---|
| 2,544,831 A | 3/1951 | Guyton | 180/6.62 |
| 2,798,565 A | 7/1957 | Rosenthal et al. | 180/6.5 |
| 3,100,547 A | 8/1963 | Rosenthal | 180/6.5 |
| 3,100,860 A | 8/1963 | Rosenthal | 318/55 |
| 3,123,173 A | 3/1964 | Jacobs | 180/74 |
| 3,213,957 A | 10/1965 | Wrigley | 180/26 |
| 3,481,417 A | 12/1969 | Jarret et al. | 180/6.5 |
| 3,757,180 A * | 9/1973 | Subler | 318/139 |
| 3,792,328 A | 2/1974 | Woloszyk | 318/139 |
| 3,794,132 A | 2/1974 | Moon | 180/13 |
| 3,909,689 A | 9/1975 | Selby et al. | 318/257 |

(List continued on next page.)

FOREIGN PATENT DOCUMENTS

| | | |
|---|---|---|
| CA | 567716 | 12/1958 |
| DE | 32 00 154 | 7/1983 |
| DE | 32 17 841 | 11/1983 |
| DE | 37 24 161 | 12/1988 |
| EP | 403 977 | 12/1990 |
| EP | 588 353 | 3/1994 |
| GB | 1 553 831 | 10/1979 |
| JP | 4-143172 A | 5/1992 |

*Primary Examiner*—Brian L. Johnson
*Assistant Examiner*—Bryan Fischmann
(74) *Attorney, Agent, or Firm*—Drinker Biddle & Reath LLP

(57) ABSTRACT

An electric scooter is disclosed that has a propulsion system switchable between two modes, one of which allows a higher maximum speed than the other. The mode is selected by a user operated button so constructed that the high-speed mode is selected only while the user continues to operate the switch. A steering angle sensor and a tilt switch are provided, which prevent the user from selecting the high-speed mode while steering sharply or while going down or across steep slopes.

24 Claims, 3 Drawing Sheets

U.S. PATENT DOCUMENTS

| | | | | |
|---|---|---|---|---|
| 3,965,402 A | | 6/1976 | Mogle | 318/55 |
| 3,993,154 A | * | 11/1976 | Simmons et al. | 180/316 |
| 4,050,533 A | | 9/1977 | Seamone | 180/6.5 |
| 4,059,786 A | | 11/1977 | Jones et al. | 318/17 |
| 4,111,274 A | * | 9/1978 | King et al. | 180/205 |
| 4,199,036 A | | 4/1980 | Wereb | 180/6.5 |
| 4,323,829 A | | 4/1982 | Witney et al. | 318/55 |
| 4,422,515 A | | 12/1983 | Loveless | 180/6.5 |
| 4,511,825 A | | 4/1985 | Klimo | 318/67 |
| 4,520,299 A | | 5/1985 | Konrad | 318/587 |
| 4,538,695 A | * | 9/1985 | Bradt | 180/19.2 |
| 4,549,624 A | | 10/1985 | Doman | 180/6.28 |
| 4,570,739 A | * | 2/1986 | Kramer | 180/216 |
| 4,634,941 A | | 1/1987 | Klimo | 318/139 |
| 4,736,648 A | * | 4/1988 | Perego | 74/519 |
| 4,773,495 A | | 9/1988 | Haubenwallner | 180/65.2 |
| 4,978,899 A | | 12/1990 | Lautzenhiser et al. | 318/269 |
| 5,036,938 A | | 8/1991 | Blount et al. | 180/208 |
| 5,121,806 A | | 6/1992 | Johnson | 180/65.5 |
| 5,168,947 A | | 12/1992 | Rodenborn | 180/19.1 |
| 5,249,636 A | | 10/1993 | Kruse et al. | 180/21 |
| 5,253,724 A | | 10/1993 | Prior | 180/65 |
| 5,270,624 A | | 12/1993 | Lautzenhiser | 318/432 |
| 5,435,404 A | | 7/1995 | Garin, III | 180/6.5 |
| 5,762,154 A | | 6/1998 | Hsu | 180/15 |
| 5,818,195 A | | 10/1998 | Frick et al. | 318/771 |

* cited by examiner

VARIABLE-SPEED CONTROL FOR VEHICLE

This application claims the benefit of Provisional application Ser. No. 60/202,457, May 8, 2000.

FIELD OF THE INVENTION

The present invention is generally related to controlling the speed of motor vehicles. More particularly, the present invention is related to controlling the speed of vehicles with limited stability, including motorized scooters for persons of limited mobility.

BACKGROUND OF THE INVENTION

A scooter is a motorized, usually battery electric, vehicle, typically for a person who is able to walk but is not able to walk long distances. For psychological reasons, scooters are designed to look more like a motor-scooter than a wheelchair. It must be possible for the scooter to be driven indoors, at least to some extent, so the scooter typically has a fairly small floorplan area. In order that a user of limited agility may easily mount and dismount, the user's seat is set fairly high. These and other constraints necessarily require some compromise with the handling of the scooter, and such scooters are not always very stable. Consequently, at present such scooters are sometimes limited to speeds within the range of about 5 to 6 mph. However, this maximum speed limits the usefulness of the scooter. For example, a journey of a few miles from the user's home to a shopping area can become oppressively time consuming.

An all-terrain vehicle (ATV) is a small, one-person motor vehicle designed to be driven over rough ground. Because of the need for high ground-clearance, an ATV may have a high center of gravity. Because it is driven for fun, the users tend to desire as high a maximum speed as is commensurate with safety. However, a speed that is attractive to the user when traveling in a straight line on generally level ground may be higher than is prudent on curves or on sloping ground. Conversely, if the maximum speed is governed to a value that is suitable for curves and slopes, the user may find the vehicle unduly tame when traveling in a straight line.

SUMMARY OF THE INVENTION

The present invention is directed to a motorized vehicle that can travel substantial distances more quickly, without compromising the stability of the vehicle.

One aspect of the present invention provides a motorized vehicle that has a propulsion system switchable between two modes, one of which allows a higher maximum speed than the other. The mode is selected by a user-operated switch so constructed that the high-speed mode is selected only while the user continues to operate the switch. Sensors are also provided to detect maneuvers or conditions for which stability may be a consideration in determining the maximum speed of the vehicle. In response to the output of such sensors the low-speed mode is automatically selected. Maneuvers sensed may include sharp turns, and conditions sensed may include steep slopes, up, down, or sideways.

BRIEF DESCRIPTION OF THE DRAWINGS

For the purpose of illustrating the invention, the drawings show forms of the invention which are presently preferred. However, it should be understood that this invention is not limited to the precise arrangements and instrumentalities shown in the drawings.

DETAILED DESCRIPTION OF THE DRAWINGS

Figure 1:
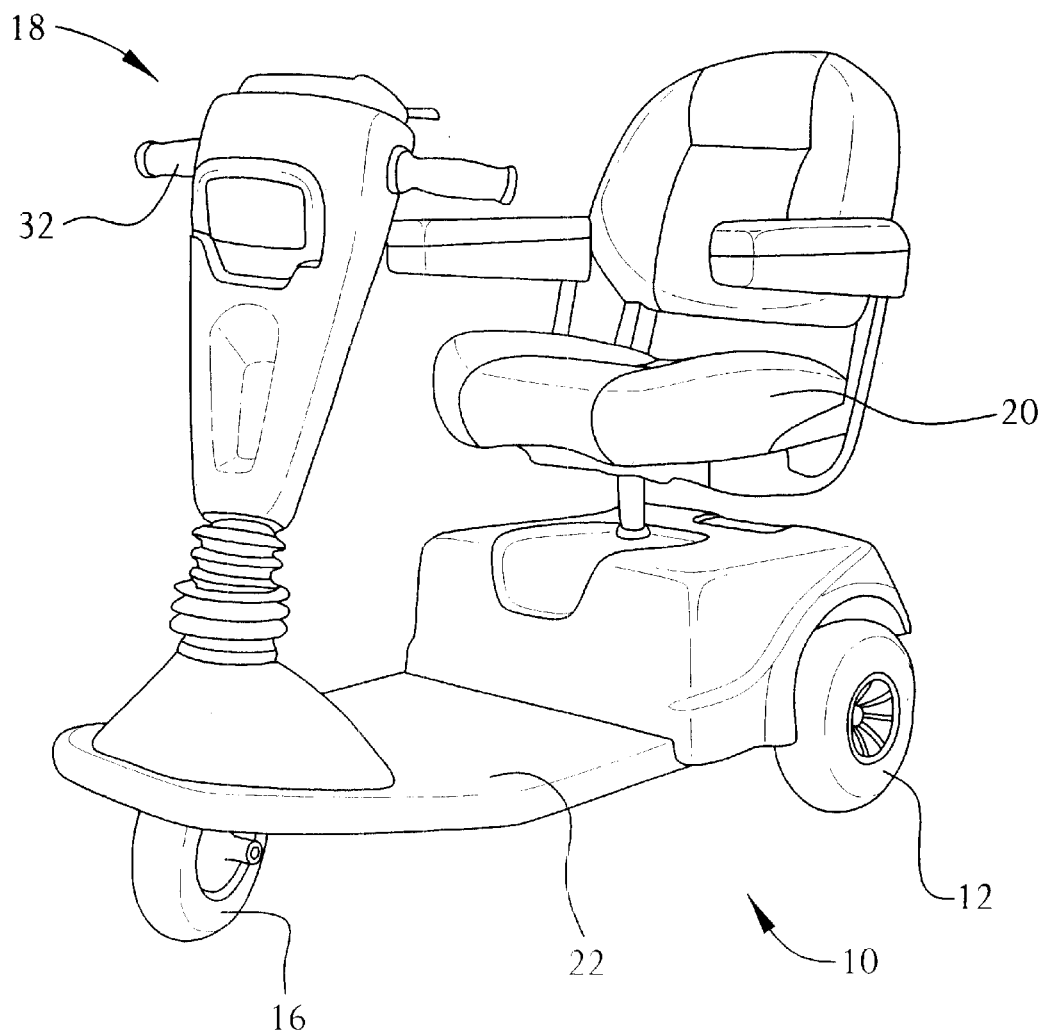
FIG. 1 is a perspective view of a scooter according to the present invention.

Referring to the drawings, FIG. 1 illustrates a scooter, which is generally denoted by the reference numeral 10. The scooter 10 is three-wheeled, with a pair of rear wheels 12 driven by a motor 14 (see FIG. 2) and a single front wheel 16 that can be steered by means of a tiller generally indicated by the reference numeral 18. The motor 14 drives the two rear wheels 12 through a differential (not shown), to allow the rear wheels to move at different speeds on curves. The motor 14 may include reduction gearing or the like, to reduce the speed of rotation of the actual motor to that of the wheels. Such reduction gearing may be conventional and, in the interests of conciseness, is not further described.

A seat 20 is mounted towards the rear of the scooter 10. Between the seat 20 and the tiller 18, a footplate 22 extends the entire width of the scooter 10. The footplate 22 is several inches above ground level when the scooter 10 is resting on its wheels 12 and 16, in order to allow clearance underneath for the scooter to pass over obstacles and uneven ground. The height of the seat 20 is set so that a user (not shown) can sit on the seat with his or her feet resting on the footplate 22. For good control of the scooter, and for ease in mounting and dismounting, the user sits in an upright posture, and his or her center of gravity is therefore comparatively high.

The motor 14 is mounted in a part of the scooter 10 behind the footplate 22. A power supply 26 for the motor 14, typically in the form of one or more electric storage batteries (see FIG. 2) is also mounted in the part 24. The motor and batteries are fairly heavy. In the interests of maneuverability, it is desirable for the overall length of the scooter to be kept short. As a result, the motor 14, the batteries 26, and the user are all close to the rear end of the scooter 10. Thus, the overall center of gravity of the vehicle and user is further to the rear than would be optimal from the point of view of stability.

Figure 2:
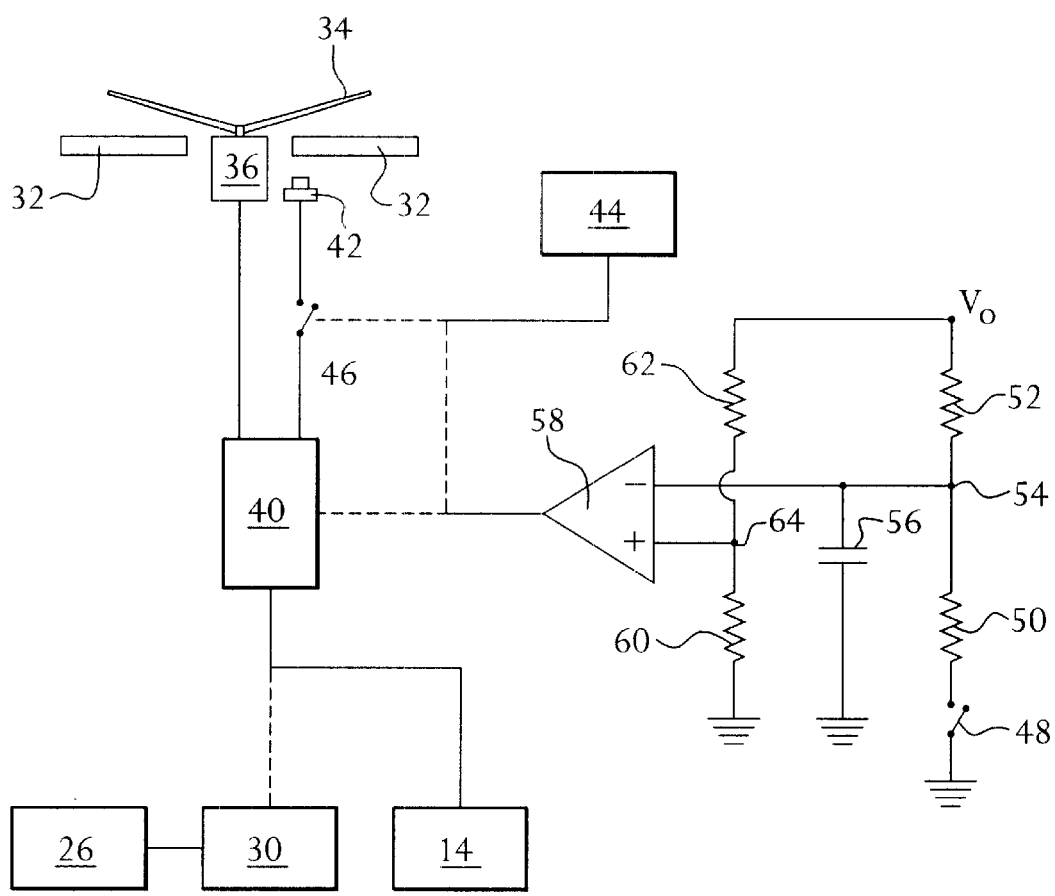
FIG. 2 is a schematic diagram of parts of a control system of the scooter shown in FIG. 1.

Referring now to FIG. 2, the motor 14 may be a motor that has two distinct modes of operation, one of which affords higher torque, and the other of which affords a higher maximum speed. A 3-phase AC motor which can be switched between a Y-wound configuration giving high torque and a Δ-wound configuration giving high speed is described in U.S. Pat. No. 5,818,195 (Frick et al.), the entire contents of which are herein imported by reference. If the motor 14 is an AC motor, or other electric motor that cannot be powered directly by batteries 26, then a suitable power converter 30 is provided. Such power converters are well known and, in the interests of conciseness, will not be described in detail.

The user steers the vehicle by means of a pair of hand-grips 32 on the tiller 18. By turning the tiller 18, the user directly turns the front wheel 16. The user controls the speed of the vehicle by means of an activator arm 34, which is pivotally mounted on the tiller 18 close to the hand-grips 32, so that the user can operate the activator arm with fingertips or thumbs, while retaining a secure hold on the hand-grips 32. The actuator arm 34 operates a sensor 36, which detects which way, and how far, the actuator arm is moved. The further the actuator arm 34 is squeezed towards the hand-grip 32, the faster the selected speed. The left-hand end of the actuator arm 34 is squeezed towards the adjacent hand-grip 32 for forward movement, and the right-hand end for reverse movement. This arrangement may also be reversed.

In the normal mode of operation of the motor 14, which is the low-speed mode, the full travel of the left-hand end of the actuator arm 34 towards the hand-grip 32 corresponds to a speed of about 5 mph. A maximum speed may be set by a governor, either mechanical or electronic, or the characteristics of the motor and power supply may be selected so that a higher speed is not attainable, at least with a user of normal weight on level ground. The speed selected by the actuator arm 34 and sensor 36 is conveyed to the motor 14 by a controller 40, which may control the motor directly and/or by controlling the power supply.

When the scooter 10 is driven in reverse, the maximum speed may be less than, for example, two thirds of the maximum forward speed. The limitation may be imposed electronically, or by mechanically limiting the travel of the actuating lever 34 towards the right hand-grip 32.

When the actuating lever 34 is released, the motor 14 brakes the scooter 10, eliminating the need for the user to operate a separate brake control.

A button 42 is mounted on the tiller 18 near the right hand-grip 32 or reverse movement side actuator. When the button 42 is pressed, it causes the controller 40 to switch the motor 14 from its normal, low-speed mode to its high-speed mode. In the high-speed mode, the maximum speed of the scooter on level ground is about 8 mph. The controller 40 keeps the motor 14 in the high-speed mode only as long as the user continues to press the button 42. The button 42 is disabled or ignored by the controller 40 when the scooter 10 is being driven backwards. The button is preferably placed on the side of the tiller opposite the forward activation lever. This essentially requires two hands on the tiller during high speed movement, one hand activating the speed control, the other on the opposite side to control the button.

The scooter 10 is capable of turns of small radius, with the travel of the front wheel being up to 60° either side of the straight-ahead position. Traveling at more than 5mph, or some other set limit, while turning sharply is not permitted. A sensor 44 monitors the angle to which the front wheel 16 is turned. The sensor 44 may monitor the position of the front wheel 16 directly, but preferably responds to its position by monitoring the position of some more conveniently positioned part of the steering mechanism that is linked to the front wheel, such as the tiller 18. If turn angle information is required for other purposes, a single, shared sensor 44 may be used. Unless such another purpose requires a different sort of turn angle sensor 44, the sensor may be a switch that operates when the tiller is turned more than a selected angle away from the straight-ahead position. The selected angle may be, for example, 2°, 5°, or 10°. The output from the turn angle sensor 44 may be an input to the controller 40, or may disable the button 42 directly. For example, the button 42 may be a normally-open switch, and the turn angle sensor 44 may operate by opening a normally-closed switch 46 in series with the button.

It is also not permitted to drive the scooter 10 down steep slopes at speeds exceeding 5 mph, or other set limit. A tilt sensor is provided, which may comprise a normally-open mercury switch 48 positioned so as to close when the scooter 10 is sloping down to the front more than a selected angle, which may be, for example, 5° or 100°. The output of the tilt switch 48 is input to the controller 40 or disables the button 42 directly, for example by opening the switch 46.

Once the circuit is activated, a sudden deceleration will preferably occur. It is contemplated that the speed reduction should be sufficient to provide a sensation to the driver of the reduction, which may also assure the driver of stability.

If the scooter hits a bump or is otherwise jolted, the mercury may splash, and the tilt switch 48 may close transiently or, if it is already closed, may open transiently. If the button 42 is enabled or disabled transiently when the scooter 10 hits a bump, the scooter will move very jerkily, and the effect of such jerkiness on the stability of the scooter 10 may be worse than the effect of allowing the user to drive at high speed over the bumpy ground. The effect of jerkiness when the user is driving at the maximum permitted speed on a turn or a downslope would also be undesirable. A delay mechanism is therefore provided, to ensure that the button 42 is disabled only when the mercury switch 48 remains closed for an appreciable period of time, which may be from 0.1 seconds to 3 seconds, and is then enabled again only when the mercury switch remains open for an appreciable period of time.

As shown in FIG. 2, the mercury switch 48 is connected directly to ground and is connected to a power supply of voltage $V_0$ through two resistors, 50 and 52. The node 54 between the two resistors 50 and 52 is also connected to ground through a capacitor 56, and is connected to the non-inverting input of a comparator 58. The inverting input of the comparator 58 is connected to ground by a resistor 60 and to the power supply by a resistor 62, at a node 64. The pair of resistors 60, 62 acts as a voltage divider. The ratio of the resistance of the resistor 50 to the resistance of the resistor 52 is less than the ratio of the resistance of the resistor 60 to the resistance of the resistor 62. For example, if $V_0$ is 12 volts, the resistor 60 may be 15 kO and the resistor 62 may be 10 kO, giving a steady voltage of 7.2 V at the node 64 and the non-inverting input of the comparator 58. The resistor 52 may then be 22 kO, and the resistor 50 must then be equal to or less than 51 kO. The capacitor 56 may be 100 $\mu F$. When the mercury switch is open, the capacitor 56 is charged through the resistor 52, and the node 54, and the inverting input of the comparator 58, are at 12 V. The comparator 58 thus gives a LOW output. When the mercury switch 48 is closed, the capacitor 56 starts to discharge through the resistor 50, and the voltage of the node 54 falls at a rate determined by the RC time constant of the resistor 50 and the capacitor 56. When the voltage of the node 54 falls below 7.2 V, the comparator 58 starts to give a HIGH output. The voltage of the node continues to fall until the pair of resistors 50, 52 is acting as a voltage divider. If the switch 48 is then opened, the capacitor 56 starts to charge through the resistor 52, and the voltage of the node 54 rises at a rate determined by the RC time constant of the resistor 52 and the capacitor 56. When the voltage of the node 54 exceeds 7.2 V, the comparator 58 starts to give a LOW output. The capacitor 56 then continues to charge until the node 54 reaches the supply voltage 12 V, at which it remains as long as the mercury switch 48 is open. The HIGH output of the comparator 58 may be taken by the controller 40 as a signal to disable or ignore the button 42, or the HIGH output may open the switch 46. The circuitry by which the comparator 58 operates the switch 46 may be of a form well known in the art and, in the interests of conciseness, is not further described.

It will be appreciated by the person skilled in the art that the specific values given are only examples, and that by suitable selection of the values of the resistors and of the capacitor 56 any desired delay times, both before the button 42 is disabled and before it is enabled, may be set.

Figure 3:
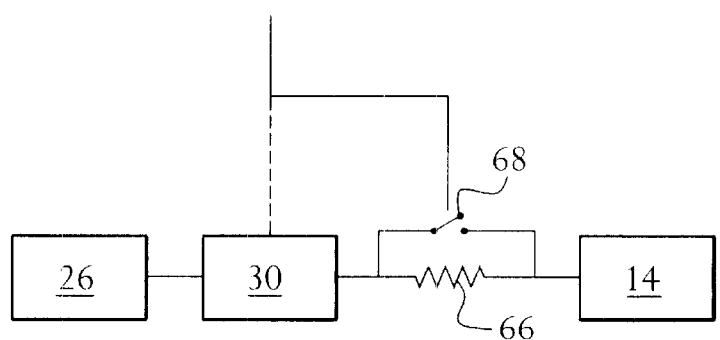
FIG. 3 is a schematic diagram, similar to part of FIG. 2, of an alternate embodiment of the scooter.

Referring now to FIG. 3, instead of using a motor 14 that can be switched between two distinct modes of operation, the controller 40 may restrict the power available to the motor in the low-speed mode. For example, a resistor 66 may be provided in series between the power supply 26 and the motor 14, which resistor reduces the power available to the motor in normal driving, and is bypassed by a switch 68 when the button 42 is activated.

Figure 4:
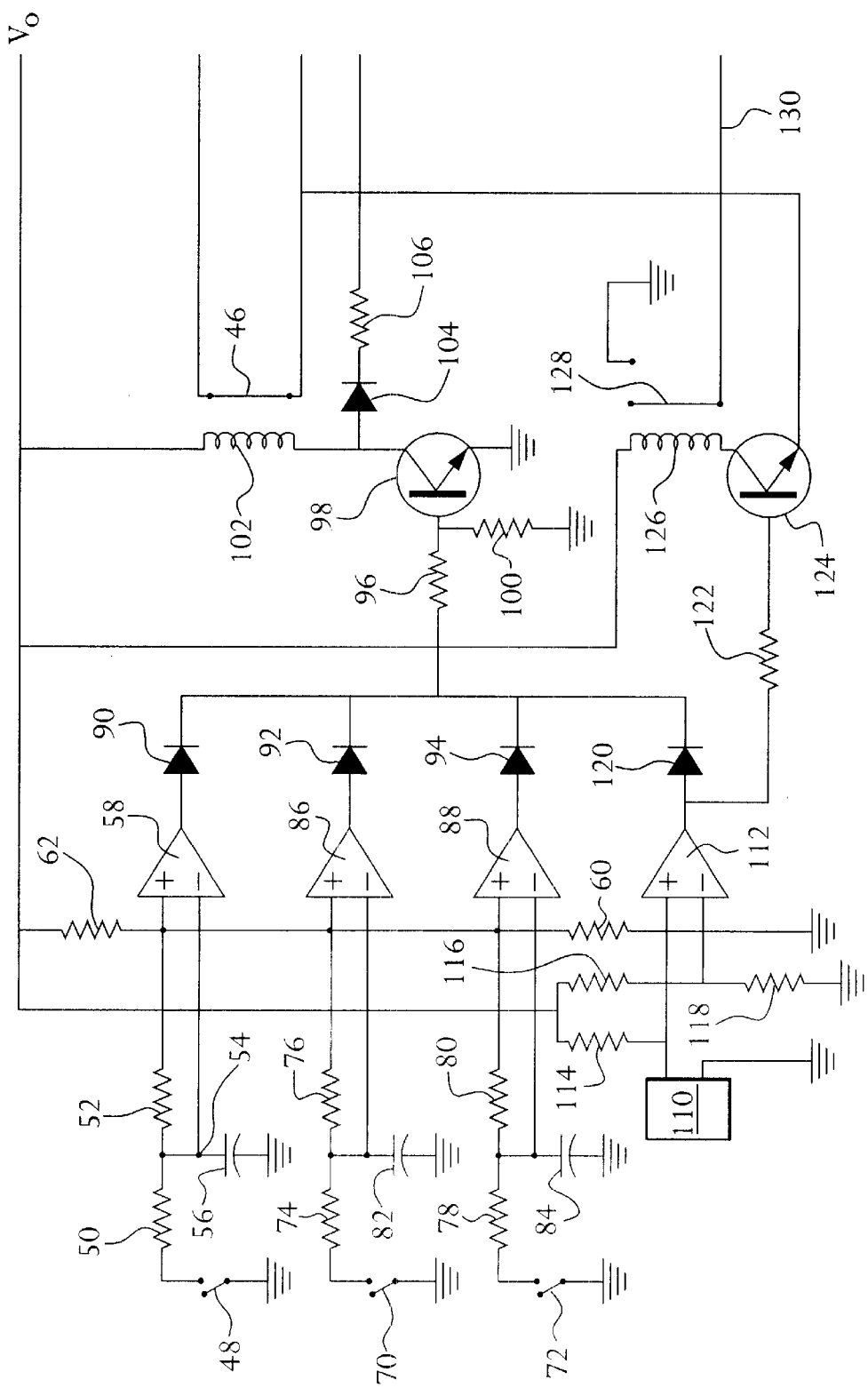
FIG. 4 is a schematic diagram, corresponding to part of FIG. 2, of a further alternate embodiment of the scooter.

Referring now to FIG. 4, in an alternate embodiment more than one sensor switch may be provided. In addition to the normally-open tilt switch 48, aligned to detect downward slopes, there are provided two additional normally-open tilt switches 70 and 72 oriented respectively to detect tilting of the vehicle to the left and to the right. Each of the mercury switches 70 and 72 is connected directly to ground and is connected to the power supply of voltage $V_0$ through a pair of resistors, 74, 76 and 78, 80 respectively, which correspond to the resistors 50, 52 associated with the switch 48. The node between the resistors 74, 76 and 78, 80 of each pair, corresponding to the node 54, is also connected to ground through a capacitor 82 or 84, respectively, corresponding to the capacitor 56, and is connected to the non-inverting input of a comparator 86 or 88, corresponding to the comparator 58. The inverting inputs of all three comparators 58, 86, and 88 are connected to ground by a resistor 60 and to the power supply by a resistor 62. The pair of resistors 60, 62 acts as a voltage divider, as explained above.

The outputs of the comparators 58, 86, and 88 are connected through diodes 90, 92, and 94 to a resistor 96 and through the resistor 96 to the base of a diode 98. The base of the transistor 98 is also connected to ground through a resistor 100, which normally holds the base LOW and keeps the transistor OFF. The emitter of the transistor 98 is connected to ground, and the collector is connected to the supply voltage $V_0$ through a relay coil 102, which operates the normally-closed switch 46, if present. The collector is also connected through a diode 104 and a resistor 106 to a logic output which may be fed to the motor controller 40.

Thus, if any of the mercury switches 48, 70, and 72 closes, the corresponding capacitor 56, 82, or 84 discharges. As described above for the switch 48 with reference to FIG. 2, that results, after a delay determined by the RC time constant of the capacitor 56, 82, or 84 and the resistor 50, 74, or 78, in the output of the comparator 58, 86, or 88 going HIGH. If any one of the comparator outputs goes HIGH, the base of the transistor 98 goes HIGH, because the diodes 90, 92, and 94 prevent the remaining LOW outputs from pulling it down. That causes the transistor 98 to turn ON. When the transistor 98 turns ON, current flows through the coil 102, which opens the switch 46 and disables the high speed mode select button 42. A logical LOW output is also provided through the resistor 106, which may instead, or in addition, cause the motor controller 40 to inhibit the high speed mode. The person skilled in the art will appreciate that is not usually necessary to use both the relay switch 46 and the logic output 106. However, the circuit shown in FIG. 4 may be provided with both, so that the single circuit is compatible with different types of motor controller 44.

A fourth switch 110, constituting the turn angle sensor 44, detects whether the steering is turned to a sharp angle. The switch 110 is a normally-closed switch, so it is connected between ground and the non-inverting input of a comparator 112, which is also connected to the supply voltage $V_0$ through a resistor 114. The switch 110 is a magnetic switch, and not a mercury switch, and is thus not prone to splashing. An RC time delay like the delays 50, 56 and 52, 56 to filter out spurious transient operations of the switch is not necessary. The inverting input of the comparator 112 is connected between $V_0$ and ground using two resistors 116 and 118 as a voltage divider. The output of the comparator 112 is connected through a diode 120 to the resistor 96. Thus, opening of the switch 110 turns the transistor 98 ON and disables the high-speed mode in the same way as closing of any of the switches 48, 70, and 72.

However, the output of the comparator 112 is also connected through a resistor 122 to the base of a second transistor 124. This connection is between the comparator 112 and the diode 120, and so is not affected if any of the other comparator outputs goes HIGH. The emitter of the transistor 124 is connected to ground. The collector of the transistor 124 is connected to the supply voltage $V_0$ through a relay coil 126. The relay coil 126 operates a normally-open switch 128, which connects a logic output 130 to ground. Thus, when the magnetic switch 110 opens, indicating a tight turn, not only is the high speed mode disabled, but the logic output 130 is pulled low.

The logic output 130 is connected to the motor controller 40, which is programmed to respond as follows. When a LOW signal is received from the logic output 106, the high speed mode is disabled for as long as that signal remains LOW, and is then enabled again. Thus, the scooter is slowed from the high-speed mode maximum speed of, say, 8 MPH to the normal maximum speed of, say, 5 MPH. On a downhill slope, or on a side slope with a three-wheeled scooter, sudden braking might aggravate the instability of the scooter, so the scooter is slowed gently. It may be sufficient merely to reduce the available power, by engaging the resistance shown in FIG. 3, so that the high speed cannot be sustained. However, when a LOW signal is also received from the logic output 130, indicating a sharp turn, it is desirable to abate the momentum of the vehicle immediately, before the turn becomes any tighter. This may be done by engaging regenerative or disk brakes, by engaging a flywheel to absorb kinetic energy, or by declutching the motor from the wheels entirely. The suspension may also be adjusted to provide extra turn stability. The speed is not merely reduced to the normal (low-speed mode) maximum speed, but to a lower speed, thus ensuring that the user of the scooter is aware of a distinct sensation of sudden deceleration. The lower speed may be 75% or 80% of the normal maximum speed, or may be 75% or 80% of the speed indicated for the normal mode by the position of the actuator arm 34. Once the scooter has been slowed to that lower speed, the speed is then immediately allowed to rise to the speed indicated for the normal mode by the position of the actuator arm 34. However, even if the high-speed mode select button 42 remains actuated, and even if the steering is straightened immediately, the motor controller 40 inhibits the high-speed mode for a short period, for example, 1½ seconds.

As to possible alternative structures, instead of the single motor 14 as shown in FIG. 2 and accompanying differential, independent motors may be provided for each of the rear wheels 12, or the two rear wheels 12 may be driven by the single motor 14 through independently variable transmissions, so that on curves the two rear wheels can be actively driven at different speeds.

As described above, the tilt switch 48 is responsive only to downward slopes. Because the weight of the motor 14, batteries 26, and user is concentrated towards the rear of the scooter 10, the scooter may under some conditions tend to tip backwards, especially if the user attempts to accelerate sharply on an upward slope. If it is desired to reduce the risk of tipping backwards, an additional switch responsive to upward slopes may also be provided, or the mercury switch 48 may be replaced by a switch that is responsive to upward as well as downward slopes. However, that may be found not to be necessary, because scooters are not usually sufficiently powerful to accelerate while traveling up slopes at high speed. The mercury switches 70 and 72 may be replaced by a single switch responsive to side slopes to either side, or the switches 48, 70, and 72 may all be replaced by a single multi-directional tilt sensor.

The scooter 10 shown in FIG. 1 is a 3-wheeled vehicle, but the speed control system described may also be applied to a 4-wheeled scooter, or to other forms of small motorized vehicles, such as an all-terrain vehicle. If the vehicle is a 4-wheeled scooter with both front wheels steered, then the steering mechanism will, of course, be more complicated than in the 3-wheeled scooter 10. The turn angle sensor 44 may then be arranged to sense the position of any convenient part of the steering mechanism. The turn angle sensor 44 is preferably arranged to sense whatever positions of such a convenient part correspond to the positions of the steerable wheels 2°, 5°, or 10° either side of straight ahead.

Although the turn angle sensor 44 and the tilt sensors 48, 70, and 72 have been described with reference to FIGS. 2 and 4 as simple switches that are either open or closed, and that when actuated open a switch 46 to disable the high speed mode select button 42, other arrangements are possible. For example, the turn sensor 44 may be a potentiometer or a multiple-position switch, giving an output indicating more precisely the angle of turn. The output from the turn sensor may then be fed to the controller 40, which may impose on the motor 14 a maximum speed that decreases progressively as the turn angle increases. The controller 40 may then act by limiting the maximum speed, so that moving the actuating lever 34 beyond a position corresponding to that speed has no effect, or may act analogously to the high speed mode select button 42 and the switch 46 shown in FIG. 2, varying the response of the controller so that the full-travel position of the actuating lever 34 always corresponds to the maximum permitted speed. Instead, or in addition, the tilt sensors 48, 70, and 72 may be variable sensors or multiple position switches, and the controller 40 may progressively limit the maximum speed as the angle of tilt increases.

The intent is to provide a higher speed for the vehicle when traveling on relatively flat ground and in a relatively straight line, without creating a possible unstable operation during turning or on an angled surface.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A motorized vehicle, comprising:
    a propulsion system switchable between two modes, one of which allows a higher maximum speed than the other;
    a switch arranged to be operated by a user of the vehicle and to switch the propulsion system between its two modes, the said switch being so constructed that the high-speed mode is selected only while the user continues to operate the switch; and
    at least one sensor responsive to a maneuver of the vehicle or to an external condition to cause the low-speed mode to be selected even if said user-operated switch is operated.

2. A motorized vehicle according to claim 1, wherein the switchable propulsion system comprises an electric motor switchable between two wiring configurations.

3. A motorized vehicle according to claim 1, wherein the switchable propulsion system comprises an electric motor and an impedance in series with the electric motor, and wherein the impedance is by-passed in the high speed mode.

4. A motorized vehicle according to claim 1, wherein said user-operated switch is an electrical switch biased into the open position, and is closed to select the high speed mode.

5. A motorized vehicle according to claim 4, wherein at least one said sensor is arranged to open a switch in series with said user-operated switch.

6. A motorized vehicle according to claim 1, wherein at least one said sensor is arranged to detect steering of the vehicle.

7. A motorized vehicle according to claim 6, wherein the steering sensor is responsive to the position of at least one steerable wheel of the vehicle.

8. A motorized vehicle according to claim 7, wherein the at least one steerable wheel is arranged to be steered by the user of the vehicle.

9. A motorized vehicle according to claim 7, wherein the steering sensor comprises a switch that operates when the at least one steerable wheel is more than a preselected angle from a straight-ahead position.

10. A motorized vehicle according to claim 6, wherein the propulsion system is responsive to the steering sensor to slow the vehicle to a speed less than the maximum speed in the low-speed mode when the steering angle sensor indicates a turn tighter than a predetermined threshold.

11. A motorized vehicle according to claim 10, wherein the propulsion system is arranged to permit the vehicle to resume normal operation in the low-speed mode immediately after slowing the vehicle to the said lesser speed.

12. A motorized vehicle according to claim 11 wherein, after permitting the vehicle to resume the maximum speed in the low-speed mode, the propulsion system is arranged to prevent the high-speed mode from being selected for a predetermined period.

13. A motorized vehicle according to claim 1, wherein at least one said sensor is arranged to detect a tilted condition of the vehicle.

14. A motorized vehicle according to claim 13, wherein at least one said sensor is arranged to detect when the vehicle is tilted down towards the front at more than a preselected angle.

15. A motorized vehicle according to claim 13, wherein at least one said sensor is arranged to detect when the vehicle is tilted to one side at more than a preselected angle.

16. A motorized vehicle, comprising:
    a propulsion system switchable between two modes, one of which allows a higher maximum speed than the other;
    an electrical switch arranged to be closed by a user of the vehicle and when closed to switch the propulsion system between its two modes, the said switch being so biased into the open position that the high-speed mode is selected only while the user continues to operate the switch; and
    at least one sensor comprising a switch that operates when at least one steerable wheel arranged to be steered by the user of the vehicle is more than a preselected angle from a straight-ahead position to detect steering of the vehicle to cause the low-speed mode to be selected even if said user-operated switch is operated.

17. A motorized vehicle, comprising:
- a propulsion system switchable between a high-speed mode and a low-speed mode, wherein the high-speed mode allows a higher maximum speed than the low-speed mode;
- a switch arranged to be operated by a user of the vehicle and to switch the propulsion system between its two said modes, the said switch being so constructed that the high-speed mode is selected only while the user continues to operate the switch; and
- at least one sensor responsive to a maneuver of the vehicle or to an external condition to prevent the vehicle from being driven at the maximum speed of the high-speed mode even if said user-operated switch is operated.

18. A motorized vehicle according to claim 17, wherein said user-operated switch is an electrical switch biased into the open position, and is closed to select the high speed mode.

19. A motorized vehicle according to claim 17, wherein at least one said sensor is arranged to open a switch in series with said user-operated switch.

20. A motorized vehicle according to claim 17, wherein at least one said sensor provides an output having more than two values indicative of a magnitude of said maneuver of the vehicle or external condition, and the maximum speed of said vehicle is varied in response to the value of said output.

21. A motorized vehicle according to claim 17, wherein at least one said sensor is arranged to detect steering of the vehicle.

22. A motorized vehicle according to claim 21, wherein the steering sensor comprises a switch that operates when the at least one steerable wheel is more than a preselected angle from a straight-ahead position.

23. A motorized vehicle according to claim 21, wherein the propulsion system is responsive to the steering sensor to slow the vehicle to a speed less than the maximum speed in the low-speed mode when the steering angle sensor indicates a turn tighter than a predetermined threshold.

24. A motorized vehicle according to claim 17, wherein at least one said sensor is arranged to detect a tilted condition of the vehicle.

* * * * *